United States Patent [19]

Harcourt

[11] Patent Number: 5,047,200
[45] Date of Patent: Sep. 10, 1991

[54] METHOD OF MAKING A FIRE HOSE

[75] Inventor: Robert M. Harcourt, King City, Canada

[73] Assignee: Angus Fire Armour Limited, Lancaster, England

[21] Appl. No.: 345,711

[22] Filed: May 1, 1989

Related U.S. Application Data

[63] Continuation-in-part of Ser. No. 51,581, May 20, 1987, abandoned.

[30] Foreign Application Priority Data

May 30, 1986 [GB] United Kingdom ............... 8613233

[51] Int. Cl.⁵ ..................... B29C 35/04; B29C 47/06
[52] U.S. Cl. .................................. 264/514; 138/126;
83/866; 83/30; 156/244.18; 156/253; 156/149;
264/154; 264/209.1; 264/324; 264/325;
264/173; 264/293; 425/113; 425/290
[58] Field of Search ............... 264/510, 514, 515, 516,
264/573, 257, 260, 154, 155, 156, 506, 231,
209.1, 320, 324, 505, 506, 325, 173, 293;
138/125, 126, 103; 156/87, 252, 253, 513,
244.19, 149, 244.18; 83/866, 867, 868, 30;
425/113, 290

[56] References Cited

U.S. PATENT DOCUMENTS

| | | | |
|---|---|---|---|
| 2,802,530 | 8/1957 | Kaufman | 264/156 |
| 3,040,383 | 6/1962 | Nassimbene | 264/231 |
| 3,056,429 | 10/1962 | Wilberg | 138/126 |
| 3,176,773 | 4/1965 | Headrick et al. | 138/125 |
| 4,091,063 | 5/1978 | Logan | 138/125 |
| 4,112,031 | 9/1978 | Gohlisch | 264/514 |
| 4,153,080 | 5/1979 | Murray, Jr. et al. | 138/126 |
| 4,182,019 | 1/1980 | Tally et al. | 264/506 |
| 4,472,126 | 9/1984 | Mitsui et al. | 425/462 |

FOREIGN PATENT DOCUMENTS

| | | |
|---|---|---|
| 802016 | 12/1968 | Canada . |
| 2424640 | 12/1975 | Fed. Rep. of Germany ...... 264/156 |
| 856955 | 12/1960 | United Kingdom . |

Primary Examiner—Jeffery Thurlow
Assistant Examiner—Mathieu Vargot
Attorney, Agent, or Firm—Wenderoth, Lind & Ponack

[57] ABSTRACT

A method of making a fire hose including the steps of extruding a tube having inner 12 and outer coverings of elastomeric material on a woven jacket made from woven synthetic textile yarns and having a weft which is unusually highly crimped. The extruded tube is placed in a confining mould or sheath having an internal diameter substantially the same as the external diameter of the hose, curing the material of the tube by internal application of heat and pressure, pressing the outer covering into tight engagement with the sheath. The sheath effectively prevents radial expansion of the hose during the curing and the outer covering is thus embossed with the surface topography of the inner surface of the sheath upon removal of the sheath. The hose thus formed has good diametral swell properties and consequently reduces the frictional forces in relation to the amount of water flowing through the hose. The hose may also be formed with perforations in the inner covering and offset perforations in the outer covering, all of which perforations terminate at the jacket 11 and allow water in the hose to percolate outward by "wicking" along the jacket yarns between the perforations in the covering and those in the covering.

7 Claims, 1 Drawing Sheet

METHOD OF MAKING A FIRE HOSE

This application is a continuation-in-part of my patent application Ser. No. 051,581 filed May. 20th 1987, now abandoned.

BACKGROUND AND SUMMARY OF THE INVENTION

This invention relates to methods of making fire hoses and has a particularly useful but not exclusive application in the manufacture of hoses used in forest fire fighting.

According to a first aspect of this invention, there is proposed a method of making a fire hose of uniform cross-section along its length comprising the steps of forming a tube by extruding onto the internal and external surfaces of a tubular fabric reinforcing jacket made from synthetic textile yarns and having highly crimped weft threads a covering of rubber or curable elastomeric material, confining the tube in a tubular restraining sheath or mould of substantially the same uniform internal diameter as the external diameter of the tube, applying heat and pressure within the tube so as to press the tube into tight engagement with the sheath or mould, substantially preventing radial expansion of the tube whereby curing of the tube is achieved while said weft threads are in a substantially untensioned condition, and removing the finished hose from the sheath or mould on completion of the curing process.

Preferably, the internal surface of the sheath or mould is rough or textured and the external surface of the covering is thus rendered complimentarily rough or textured.

According to a second aspect this invention provides a fire hose comprising a woven or braided tubular jacket having a lining on its internal surface and a covering on its external surface which lining and covering are formed from rubber or elastomeric material, a first set of perforations extending outward through the lining and terminating at the jacket, and a second set of perforations extending through the covering and terminating at the jacket which perforations are staggered with respect to the perforations of the first set.

The invention further provides a method of making a fire hose comprising the steps of forming a tube by extruding a rubber or elastomeric material onto the internal and external surfaces of a woven or braided tubular jacket to form an internal lining and an external covering on the jacket, forming a plurality of first through perforations in the external covering which first perforations terminate at the jacket, and forming a plurality of second perforations extending through the thickness of the lining and terminating at the jacket, which second perforations are offset with respect to said first perforations in the external covering, whereby a flow from the second to the first perforations is constrained to take place along the material of the jacket.

BRIEF DESCRIPTION OF THE DRAWINGS

The invention will now be described in more detail with reference to the accompanying diagrammatic drawings in which.

DESCRIPTION OF THE PREFERRED EMBODIMENT

Figure 1:
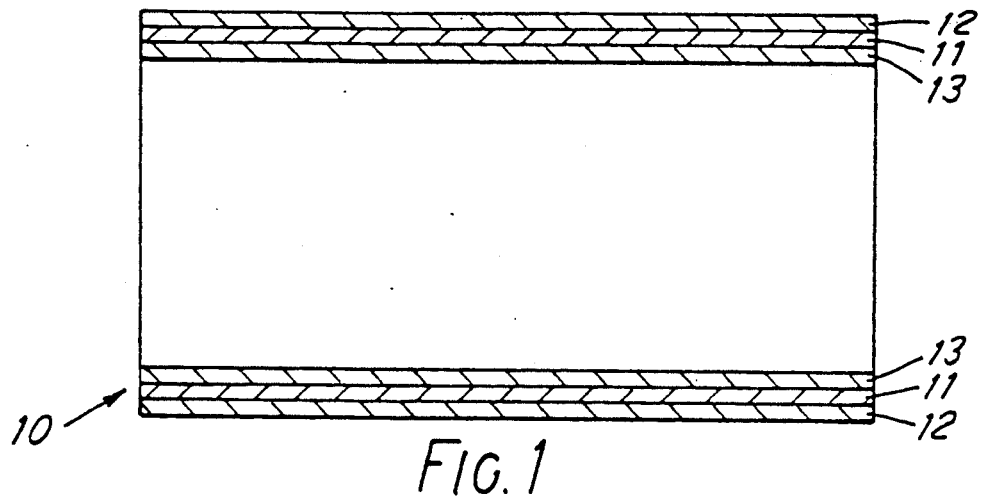
FIG. 1 is a longitudinal cross-section illustrating the first stage in the manufacture of a hose according to the invention.
Figure 2:
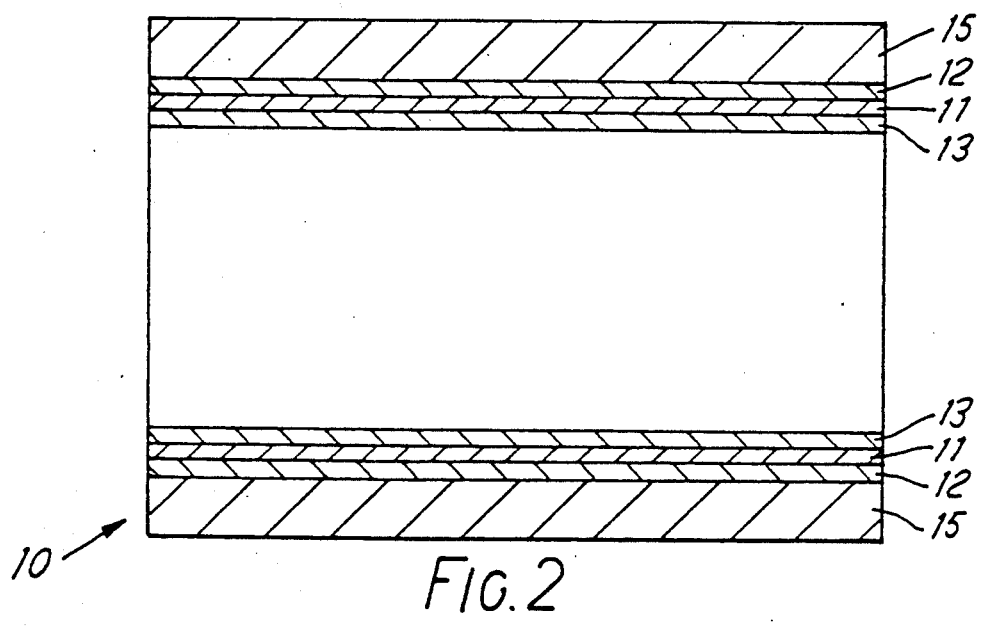
FIG. 2 illustrates in longitudinal cross-section a second stage in the manufacture of a hose according to the invention.

Referring to FIGS. 1 and 2 in the first stage of manufacture of a reinforced rubber fire hose a tube 10 is produced using a hose extruder, preferably by an apparatus as described in British Patent Specification No. 856955, incorporating a mandrel over which is drawn a woven reinforcing jacket 11 the weft of which is unusually highly crimped. In the present method, however, the jacket 11 has a slightly larger diameter than the external diameter of the mandrel. The rubber is extruded onto the internal surface of the jacket 11 to form a lining 13 and onto the external surface of the jacket 11 to form a covering 12. The tube thus has the external appearance of a standard hose formed by the machine but the woven jacket 11 has an unusually highly crimped weft. It will be appreciated that the lining 13 and the covering 12 may be formed from the same material as each other or from different materials.

The uncured modified reinforced tube 10 thus extruded from the extruder is inserted into a sheath 15 or mould having a smaller internal diameter than the external diameter of the tube 10. The tube 10 is then vulcanised by superheated steam caused to flow through the tube, using a conventional controlled steam pressure/temperature cycle. The sheath then confines the tube 10 and substantially prevents further outward radial expansion of the tube. The pressure presses the tube 10 into tight engagement with the internal surface of the sheath 15 or mould as shown in FIG. 2. As the tube tries to expand radially, the outer covering 12 presses hard against the sheath 15 so that the surface topography of the inside of the sheath is impressed on the external surface of the covering 12 of the hose. After the hose has been removed from the sheath on completion of the curing process there remains a permanent textured imprinted pattern on the covering.

In one example, two fire hoses of nominally 1½" bore were made, one (A) by the conventional method and the other (B) by a method according to the present invention. In the conventional method, the reinforcing fabric jacket was woven from synthetic textile yarns had a diameter of 1⅝" and was passed through an extruder in the manner described in British Patent Specification No. 856955 so as to have its internal and external surfaces coated with rubber or other curable elastomeric material.

The hose was subjected to a conventional curing process in which superheated steam was passed through the hose, which was not confined in a mould, in a controlled pressure/temperature cycle in which the steam was at pressures in the range 40 to 80 psi and at related temperatures in the range 145° to 165° C. Under these conditions the weft yarns in the jacket were under tension and were thus cured while in that state, causing them to have increased resistance to extension and to impart to the finished hose substantial resistance to swelling over the normal range of water pressures used in fighting forest fires. The resulting hose A had an external diameter of 1.69".

In the present method the jacket was again woven from synthetic textile yarns but had a weft with an unusually high degree of crimp. The woven jacket had a diameter of 1 23/32", i.e. slightly larger than in the first arrangement, so as to be a slightly looser fit on the mandrel of the extruder, and was passed through the extruder in the same manner as in the first-described method to produce a hose having an external diameter of 1 11/16". This extruded hose was then sprayed with a silicone release preparation and drawn into a TERYLENE polyester jacket having an internal diameter of 1 39/64", i.e. 5/64" less than the external diameter of the extruded hose. The hose was then subjected to internal pressure using superheated steam in a controlled pressure/temperature cycle to cure the hose. The internal pressure caused the hose to be pressed into tight engagement with the internal surface of the confining terylene jacket and imprinted on the external surface of the hose a pattern complementary to that on the internal surface of the TERYLENE polyester jacket. On completion of curing, hose B was withdrawn from the confining jacket and was found to have an external diameter of 1.69".

The two hoses were subjected to pressure tests for purposes of comparison. The internal diameters cannot readily be measured when the hoses are under internal pressure but the external diameters provide a satisfactory parameter therefor. The results were as follows:

|  | 0 PSI | 50 PSI | 100 PSI |
|---|---|---|---|
| Hose A (ext. dia.) | 1.69" | 1.73" | 1.76" |
| Hose B (ext. dia.) | 1.69" | 1.86" | 1.92" |

Thus under an internal pressure of 50 PSI Hose A swelled by 2.3% and Hose B swelled by 10%, and under an internal pressure of 100 PSI Hose A swelled by 4.1% and Hose B swelled by 13.6%.

Figure 3:
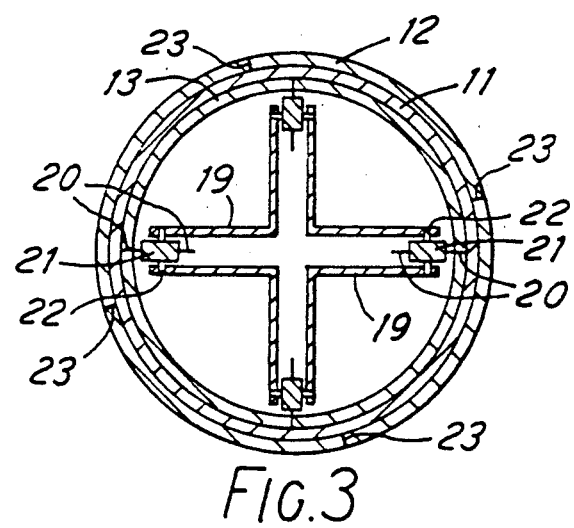
FIG. 3 illustrates in radial cross-section how the hose is formed with perforations.

In the next stage of manufacture means for example as described in our Canadian Patent No. 802016 were used to form perforations in the hose. In the present arrangements the perforations 23 made in this way extend inwardly through the covering 12 and terminate at the woven jacket 11. In standard hoses these perforations are used to allow the escape of volatile materials during the vulcanising process and are subsequently sealed with latex to avoid the ingress of moisture, but in the present method these perforations are left open for the purpose of providing channels by which water is permitted to percolate to the external surface in order to resist damage to the hose by the heat of the fire. It will be apparent that if the channels were to extend directly through the covering 12 and lining 13 the dilation of the hose under the internal pressure of water would also dilate the through-channels and would tend to result in an unacceptable loss of water from the hose. According to a feature of the present invention, the perforations 23 are complemented by further perforations made in the lining 13 of the hose as illustrated in FIG. 3, these latter perforations extending outwardly through the lining and terminating at the woven jacket 11 but being offset with respect to the perforations 23. For this purpose, rollers 21 are provided having a plurality of pins 20 extending therefrom and are rotatably mounted on respective axles 22. The axles 22 are secured on a carrier 19 which is placed inside the hose. The pins 20 are of such a size and number that when the carrier 19 is drawn along the hose, the pins perforate the lining 13, the perforations thus formed terminating at the woven jacket 11.

When the hose is in use water is able to penetrate the lining 13 via the inner perforations, then to wick along the yarns of the woven jacket 11 and then to pass via the outer perforations 23 to the external surface of the hose. The wicking effect thus operates to restrict the flow of water to the external surface of the hose.

In reinforced hoses as made hitherto, curable reinforcing jackets were made from yarns having substantially no crimp and in a quantity which is designed to minimise swelling of the hose and which is based on the general rule that the degree of reinforcement is proportional to the mass of the reinforcement. However, in the known method, because the hose is not restrained diametrally, the yarns in the jacket are subjected to high temperatures to heat-set them, whilst in a state of tension caused by the pressure. The result of heat setting yarns under tension is that the yarns have a low extensibility under a given load. Applied to a hose this means that the hose has reduced diametral swell properties.

In forest fire-fighting, however, friction loss is a common problem. Larger diameter hoses reduce losses due to friction and the method described above is thus advantageous in producing a compact hose which has good diametral swell properties thereby reducing the friction losses whilst in use. The hose produced by the present method has better diametral swell properties because the unusually high degree of curing in the weft which is heat-set while under zero or substantially zero tension produces a hose having a lesser resistance to swelling. At the internal water pressures used in fire-fighting the crimp heat-set in the weft is gradually removed but operates in the manner of a soft spring, and when the internal pressure reaches its highest levels within the capacity of the hose to resist, the weft yarns effectively become straight yarns and operate as such. The modified hose is, however, extruded using the same machinery as the standard hose and therefore has, when not in use, the same internal and external diameters as the standard hose thereby enabling it to be used with standard hose couplings.

Forest fire-fighters traditionally roll their hoses into a rugby ball shape known as "melon roll". When using hoses which have an embossed external surface produced by curing the hose whilst contained in the sheath it has been found that the outer surface of the hose is less slippery than standard hoses because its surface is roughened or textured by its engagement under pressure with the internal surface of the encircling sheath and thereby facilitates rolling into a melon ball even when the surface of the hose is wet.

When a hose is used in forest fire conditions it often has to lie against very hot ground and undergrowth. It is often necessary therefore to use "percolating" hoses which ensure that the external surface of the hose is continuously wet and therefore has enhanced resistance to burning and damage. The percolating hose produced by the present method allows a gradual seepage of water to its external surface which does not significantly affect its ability to transmit water to the fire. It has also been found that the textured surface of the hose assists in retaining a film of water on its surface.

What is claimed is:

1. A method of making a fire hose of uniform cross-section along its length, comprising the steps of:

providing a tubular fabric reinforcing jacket made from synthetic textile yarns and having highly crimped weft threads;

forming a tube by extruding onto the internal and external surfaces of said tubular fabric reinforcing jacket a lining and covering of rubber or curable elastomeric material;

providing a tubular restraining sheath or mould of substantially the same uniform internal diameter as the external diameter of said tube;

curing said tube while said highly crimped weft threads are in a substantially untensioned condition by confining said tube in said tubular restraining sheath or mould and applying heat and pressure within said tube, pressing said tube into tight engagement with said sheath or mould, said sheath or mould substantially preventing radial expansion of said tube; and removing said tube from said sheath or mould after said step of substantially untensioned curing, thereby forming a water-swellable fire hose.

2. The method of claim 1, wherein said step of curing comprises passing superheated steam along said tube to apply said heat and pressure within said tube.

3. The method of claim 2, wherein said step of providing a sheath or mould further comprises providing a sheath or mould which comprises a TERYLENE jacket.

4. The method of claim 1, wherein said step of providing a sheath or mould further comprises providing a sheath or mould having a roughened or textured internal surface, wherein said pressure during said step of curing presses the external surface of said tube against the internal surface of said sheath or mould to cause the external surface of the tube to be correspondingly roughened or textured.

5. A method of making a fire hose, comprising:
forming a tube by extruding a rubber or elastomeric material onto the internal and external surfaces of a woven or braided tubular jacket to form an internal lining and an external covering on said jacket;

forming a plurality of first perforations in said external covering extending from the outer surface thereof through to and terminating at said woven or braided tubular jacket; and forming a plurality of second perforations in said internal lining offset with respect to said first perforations in said external covering and extending from the inner surface of said internal lining through to and terminating at said woven or braided tubular jacket, wherein fluid flow from said second to said first perforations is constrained to take place along the material of said jacket.

6. The method of making a fire hose of claim 5, wherein said step of forming said plurality of second perforations comprises providing a carrier having a pin roller rotatably mounted thereon, introducing said carrier into the inside of said tube and causing relative movement of said tube and said carrier in a direction lengthwise of said tube.

7. A method of making a fire hose of uniform cross-section along its length, comprising the steps of:

providing a woven or braided tubular fabric reinforcing jacket made from synthetic textile yarns and having highly crimped weft threads;

forming a tube by extruding onto the internal and external surfaces of said tubular fabric reinforcing jacket a lining and covering of rubber or curable elastomeric material;

providing a tubular restraining sheath or mould of substantially the same uniform internal diameter as the external diameter of said tube;

curing said tube while said highly crimped weft threads are in a substantially untensioned condition by confining said tube in said tubular restraining sheath or mould and applying heat and pressure within said tube, pressing said tube into tight engagement with said sheath or mould, said sheath or mould substantially preventing radial expansion of said tube, removing said tube from said sheath or mould after said step of curing;

forming a plurality of first perforations in said external covering extending from the outer surface thereof through to and terminating at said woven or braided tubular jacket; and forming a plurality of second perforations in said internal lining offset with respect to said first perforations in said external covering and extending from the inner surface of said internal lining through to and terminating at said woven or braided tubular jacket; wherein fluid flow from said second to said first perforations is constrained to take place along the material of said jacket.

* * * * *